United States Patent
Hashimoto et al.

(10) Patent No.: US 9,703,975 B2
(45) Date of Patent: Jul. 11, 2017

(54) INDUSTRIAL EQUIPMENT MANAGEMENT SYSTEM, INDUSTRIAL EQUIPMENT MANAGEMENT SERVER, INDUSTRIAL EQUIPMENT MANAGEMENT METHOD, AND INFORMATION STORAGE MEDIUM

(71) Applicant: Kabushiki Kaisha Yaskawa Denki, Kitakyushu-shi, Fukuoka (JP)

(72) Inventors: Ayaka Hashimoto, Kitakyushu (JP); Tadashi Okubo, Kitakyushu (JP); Hiroshi Hashimoto, Kitakyushu (JP)

(73) Assignee: KABUSHIKI KAISHA YASKAWA DENKI, Kitakyushu-Shi, Fukuoka (JP)

( * ) Notice: Subject to any disclaimer, the term of this patent is extended or adjusted under 35 U.S.C. 154(b) by 94 days.

(21) Appl. No.: 14/526,544

(22) Filed: Oct. 29, 2014

(65) Prior Publication Data
US 2015/0121556 A1 Apr. 30, 2015

(30) Foreign Application Priority Data

Oct. 29, 2013 (JP) ................................. 2013-224746

(51) Int. Cl.
*G06F 7/04* (2006.01)
*G06F 17/30* (2006.01)
(Continued)

(52) U.S. Cl.
CPC ..... *G06F 21/6218* (2013.01); *G05B 19/0428* (2013.01)

(58) Field of Classification Search
CPC ...... G06F 21/60; G06F 21/604; G06F 21/606; G06F 21/6218; G06F 21/6227; G06F 21/6236; G06F 21/00
(Continued)

(56) References Cited

U.S. PATENT DOCUMENTS 6,233,588 B1 * 5/2001 Marchoili .......... G07C 9/00103
7,716,497 B1 * 5/2010 Trimberger ............. G06F 21/62
365/186

(Continued)

FOREIGN PATENT DOCUMENTS

JP  H08-50559 A  2/1996
JP  2007-065926 A  3/2007
(Continued)

OTHER PUBLICATIONS

European Search Report for corresponding Patent Application No. EP14190631 dated Apr. 13, 2015.
(Continued)

*Primary Examiner* — Kambiz Zand
*Assistant Examiner* — Trong Nguyen
(74) *Attorney, Agent, or Firm* — Hubbs, Enatsky & Inoue PLLC

(57) ABSTRACT

An individual area controller of an industrial equipment management system controls access to an individual area which is a storage area that is associated with an individual ID on a server, based on the individual ID. A group area controller controls access to a group area which is a storage area that is associated with a group ID on a server, based on the individual ID that belongs to the group ID. A copy restrictor restricts copying of equipment information about an industrial equipment that is stored in the group area to the individual area.

9 Claims, 10 Drawing Sheets

(51) Int. Cl.
*H04N 7/16* (2011.01)
*G06F 21/62* (2013.01)
*G05B 19/042* (2006.01)

(58) Field of Classification Search
USPC .......................... 726/2–5, 16–17, 21, 26–33
See application file for complete search history.

(56) References Cited

U.S. PATENT DOCUMENTS

| | | |
|---|---|---|
| 2003/0226010 A1* | 12/2003 | Arima ..................... G05B 9/02 |
| | | 713/150 |
| 2007/0022408 A1 | 1/2007 | Brandt et al. |
| 2007/0047006 A1 | 3/2007 | Sakai |
| 2007/0079355 A1 | 4/2007 | Chand et al. |
| 2007/0226339 A1* | 9/2007 | Suen ................. G06F 17/30522 |
| | | 709/226 |
| 2008/0052514 A1 | 2/2008 | Nakae |
| 2009/0300725 A1* | 12/2009 | Carney .............. G06F 21/6218 |
| | | 726/4 |
| 2011/0241447 A1 | 10/2011 | Ando et al. |

FOREIGN PATENT DOCUMENTS

| | | |
|---|---|---|
| JP | 2009-265854 A | 11/2009 |
| JP | 2011-229359 A | 11/2011 |
| WO | 2006059639 A1 | 6/2006 |

OTHER PUBLICATIONS

Office Action dated Sep. 13, 2016 for corresponding JP application No. 2013-224746.
The Partial Translation of the Office Action for corresponding JP application No. 2013-224746 dated Sep. 13, 2016.

* cited by examiner

FIG.4

| INDIVIDUAL ID | SERIAL NUMBER | EQUIPMENT INFORMATION | | | |
|---|---|---|---|---|---|
| | | SETTING INFORMATION | USE | OPERATION CONDITION MEMORANDUM | ····· |
| u00001 | S00001 | PARAMETER A FIRMWARE A·Ver1.0 | USE A | MEMORANDUM A | ····· |
| | S00002 | PARAMETER B FIRMWARE B·Ver1.0 | USE B | MEMORANDUM B | ····· |
| | S00003 | PARAMETER C FIRMWARE A·Ver1.0 | USE B | MEMORANDUM C | ····· |
| | ⋮ | ⋮ | ⋮ | ⋮ | ····· |
| u00002 | S00001 | PARAMETER D FIRMWARE A·Ver1.0 | USE D | MEMORANDUM D | ····· |
| | S00002 | PARAMETER E FIRMWARE B·Ver1.0 | USE E | MEMORANDUM E | ····· |
| | S00003 | PARAMETER F FIRMWARE C·Ver1.0 | USE F | MEMORANDUM F | ····· |
| | ⋮ | ⋮ | ⋮ | ⋮ | ····· |
| ⋮ | ⋮ | ⋮ | ⋮ | ⋮ | ⋮ |

FIG.5

| GROUP ID | INDIVIDUAL ID LIST | AUTHORITY DATA | SERIAL NUMBER | INDIVIDUAL ID | EQUIPMENT INFORMATION ||||
|---|---|---|---|---|---|---|---|---|
| | | | | | SETTING INFORMATION | USE | OPERATION CONDITION MEMORANDUM | ⋯ |
| g00001 | LIST 1 | AUTHORITY DATA 1 | S00001 | u00001 | PARAMETER A FIRMWARE A・Ver1.0 | USE A | MEMORANDUM A | ⋯ |
| | | | | u00002 | PARAMETER D FIRMWARE A・Ver1.0 | USE D | MEMORANDUM D | ⋯ |
| | | | S00002 | u00001 | PARAMETER B FIRMWARE B・Ver1.0 | USE B | MEMORANDUM B | ⋯ |
| | | | | u00002 | PARAMETER E FIRMWARE B・Ver1.0 | USE E | MEMORANDUM E | ⋯ |
| | | | ⋯ | ⋯ | ⋯ | ⋯ | ⋯ | ⋯ |
| g00002 | ⋯⋯ | ⋯⋯ | ⋯⋯ | ⋯⋯ | ⋯⋯ | ⋯⋯ | ⋯⋯ | ⋯⋯ |

FIG.6

| GROUP ID | INDIVIDUAL ID | SETTING INFORMATION ID | SETTING INFORMATION |
|---|---|---|---|
| g00001 | u00001 | c00001 | PARAMETER A<br>FIRMWARE A・Ver1.0 |
| g00004 | u00004 | c00002 | PARAMETER D<br>FIRMWARE D・Ver1.0 |
| ⋮ | ⋮ | ⋮ | ⋮ |

INDUSTRIAL EQUIPMENT MANAGEMENT SYSTEM, INDUSTRIAL EQUIPMENT MANAGEMENT SERVER, INDUSTRIAL EQUIPMENT MANAGEMENT METHOD, AND INFORMATION STORAGE MEDIUM

CROSS-REFERENCE TO RELATED APPLICATION

The present disclosure contains subject matter related to that disclosed in Japanese priority patent application JP 2013-224746 filed in the Japan Patent Office on Oct. 29, 2013, the entire contents of which are hereby incorporated by reference.

BACKGROUND

Field of the Invention

The embodiments disclosed herein relate to an industrial equipment management system, an industrial equipment management server, an industrial equipment management method, and an information storage medium.

Description of the Related Art

In Japanese Patent Application Laid-open No. 2011-229359, there is disclosed a system in which an engineering tool is connected to a motor control device in order to allow a user to adjust parameters and the like of the motor control device and in order to display various types of information about the motor control device.

SUMMARY

According to one aspect of the present invention, there is provided an industrial equipment management system, including: an individual area controller configured to control access to an individual area which is a storage area that is associated with an individual ID on a server, based on the individual ID; a group area controller configured to control access to a group area which is a storage area that is associated with a group ID on a server, based on the individual ID that belongs to the group ID; and a copy restrictor configured to restrict copying of equipment information about an industrial equipment that is stored in the group area to the individual area.

According to one aspect of the present invention, there is provided an industrial equipment management server, including: an individual area controller configured to control access to an individual area which is a storage area that is associated with an individual ID on a server, based on the individual ID; a group area controller configured to control access to a group area which is a storage area that is associated with a group ID on the server, based on the individual ID that belongs to the group ID; and a copy restrictor configured to restrict copying of equipment information about an industrial equipment that is stored in the group area to the individual area.

According to one aspect of the present invention, there is provided an industrial equipment management method, including: controlling access to an individual area which is a storage area that is associated with an individual ID on a server, based on the individual ID; controlling access to a group area which is a storage area that is associated with a group ID on the server, based on the individual ID that belongs to the group ID; and restricting copying of equipment information about an industrial equipment that is stored in the group area to the individual area.

According to one aspect of the present invention, there is provided a non-transitory computer-readable information storage medium having stored thereon a program for causing a computer to: control access to an individual area which is a storage area that is associated with an individual ID on a server, based on the individual ID; control access to a group area which is a storage area that is associated with a group ID on a server, based on the individual ID that belongs to the group ID; and restrict copying of equipment information about an industrial equipment that is stored in the group area to the individual area.

According to one aspect of the present invention, there is provided an industrial equipment management system, including: an individual area controlling unit configured to control access to an individual area which is a storage area that is associated with an individual ID on a server, based on the individual ID; a group area controlling unit configured to control access to a group area which is a storage area that is associated with a group ID on a server, based on the individual ID that belongs to the group ID; and a copy restricting unit configured to restrict copying of equipment information about an industrial equipment that is stored in the group area to the individual area.

BRIEF DESCRIPTION OF THE DRAWINGS

FIG. 4 is a table showing an example of an individual equipment information database.

FIG. 5 is a table showing an example of a group equipment information database.

FIG. 6 is a table showing an example of a customization information database.

DESCRIPTION OF THE EMBODIMENTS

The inventors of the present invention have observed that every user of an industrial equipment draws fully upon his/her own know-how when adjusting parameters and keeping track of or predicting minute changes in the condition of the equipment. It is therefore beneficial, for example, for a corporate business to let users who work for the corporate business share data that shows their respective know-bows with one another. On the other hand, giving the users unlimited reign on the handling of the data can lead to improper leakage of the know-bows in cases such as when the users resigns from the corporate business.

As a result of extensive research and development on reducing the risk of improper leakage of users' know-bows, the inventors of the present invention have thought up a novel and original industrial equipment management system and others. Now, the industrial equipment management system and others are described in detail through an embodiment.

[Industrial Equipment Management System According to the Embodiment of the Present Invention]

Figure 1:
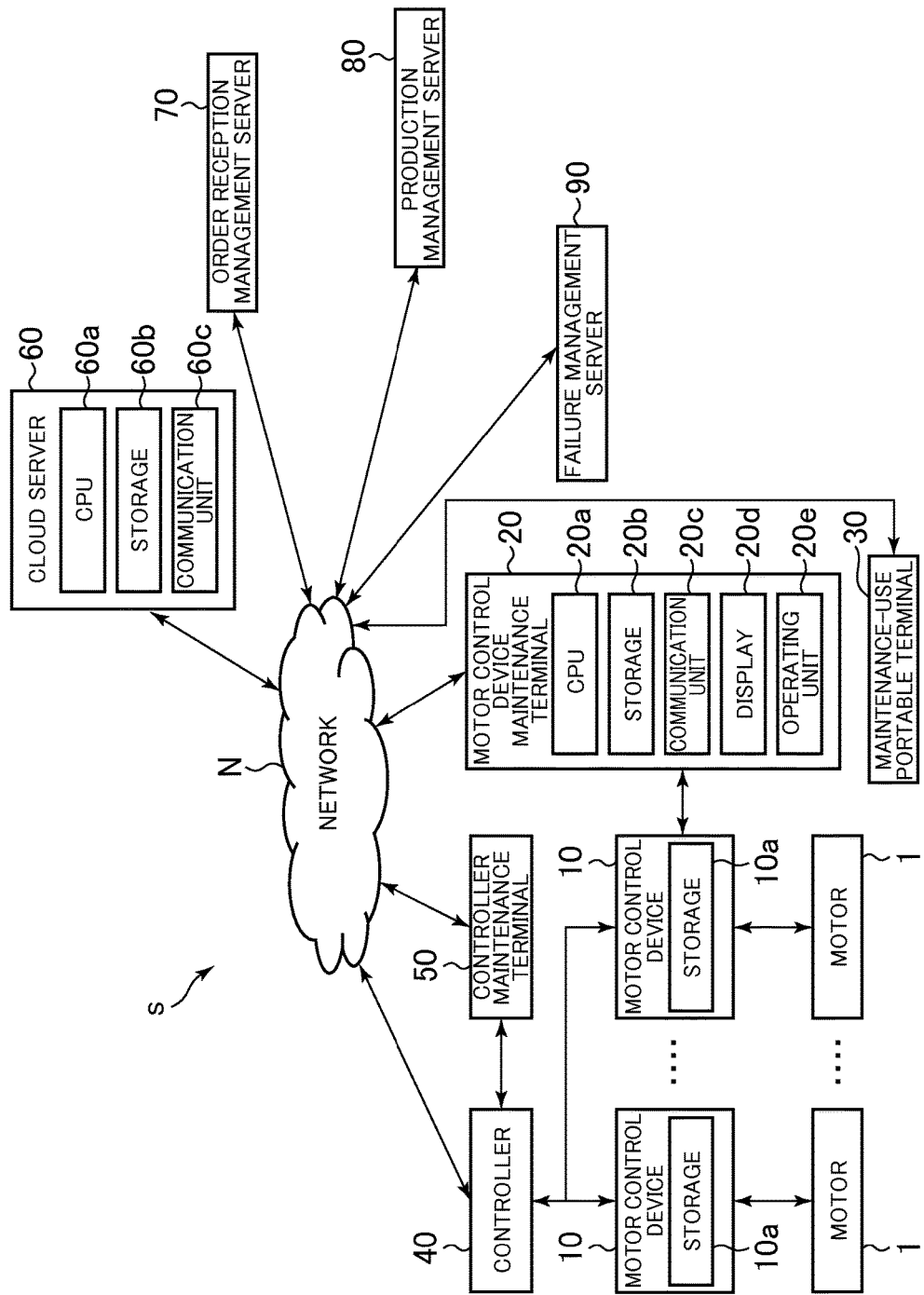
FIG. 1 is a diagram illustrating an example of the overall configuration of an industrial equipment management system according to an embodiment of the present invention.

FIG. 1 is a diagram illustrating an example of the overall configuration of an industrial equipment management system according to the embodiment of the present invention. As illustrated in FIG. 1, the industrial equipment management system, which is denoted by S, includes a plurality of motors 1, a plurality of motor control devices 10, a motor control device maintenance terminal 20, a maintenance-use portable terminal 30, a controller 40, a controller maintenance terminal 50, a cloud server 60, an order reception management server 70, a production management server 80, and a failure management server 90. The motor control device maintenance terminal 20, the maintenance-use portable terminal 30, the controller 40, the controller maintenance terminal 50, the cloud server 60, the order reception management server 70, the production management server 80, and the failure management server 90 are connected to one another in a manner that allows for data transmission to and data reception from one another via a network N.

This embodiment is described by taking as an example a case where the industrial equipment management system S is used by a maker who sells, and provides aftercare for, various industrial equipments (for example, the motor control devices) and by users who purchase and use those industrial equipments. For instance, users own their respective motors 1, their respective motor control devices 10, the motor control device maintenance terminal 20, the maintenance-use portable terminal 30, the controller 40, and the controller maintenance terminal 50. The maker manages the cloud server 60, the order reception management server 70, the production management server 80, and the failure management server 90.

Each of the motor control devices 10 is formed by integrating a servo amplifier and a control circuit, and operates in accordance with an instruction issued by the controller 40. A storage 10a of each of the motor control devices 10 includes a RAM and an EEPROM, and stores a parameter, firmware, and the like for operating the motor control device 10. In this embodiment, a two-dimensional code including a serial number and the like is assigned to each of the motor control devices 10.

The motor control device maintenance terminal 20 is a general computer such as a personal computer, and includes a CPU 20a, a storage 20b, a communication unit 20c, a display 20d, and an operating unit 20e. The storage 20b includes a RAM, a hard disk, and the like to store various programs and data. The CPU 20a executes various types of processing based on those programs and data. The communication unit 20c includes a network card, various communication connectors, and the like to hold communication to and from other devices. The display 20d is a liquid crystal display or the like, and displays various screens upon an instruction issued by the CPU 20a. The operating unit 20e is an input device such as a mouse or a keyboard.

The motor control device maintenance terminal 20 can be connected to each of the motor control devices 10, and used by the user to perform maintenance work. For example, the motor control device maintenance terminal 20 writes a parameter designated by the user to the storage 10a of each of the motor control devices 10. Further, the motor control device maintenance terminal 20 downloads firmware selected by the user from the cloud server 60 to be installed onto the storage 10a of each of the motor control devices 10, and updates the installed firmware. In addition, in this embodiment, the motor control device maintenance terminal 20 can display various types of information registered in the cloud server 60 on the display 20d.

The maintenance-use portable terminal 30 is a portable information terminal such as a smartphone or a tablet terminal. The user can perform the same maintenance work as the motor control device maintenance terminal 20 by using the maintenance-use portable terminal 30. In this embodiment, the maintenance-use portable terminal 30 includes a camera for photographing the two-dimensional code of the motor control device 10. The maintenance-use portable terminal 30 analyzes an image of the two-dimensional code photographed by the camera, and identifies the serial number or the like serving as an individual identification number of each of the motor control devices 10.

The controller 40 outputs to the motor control devices 10 upper-layer control commands for controlling their respective motors 1 so that the motor control devices 10 are controlled in an integrated manner.

The controller maintenance terminal 50 is a general computer such as a personal computer. The controller maintenance terminal 50 is connected to the controller 40 and is used by a user for maintenance work. For example, the controller maintenance terminal 50 creates a program executed by the controller 40 and a time chart as instructed by a user, and displays various types of information registered in the cloud server 60.

The cloud server 60 is a server computer for managing various types of information used in the industrial equipment management system S, and includes a CPU 60a, a storage 60b, and a communication unit 60c. Those hardware configurations are the same as those of the CPU 20a, the storage 20b, and the communication unit 20c, respectively, and hence descriptions thereof are omitted. The cloud server 60 manages personal information on each user, information on the industrial equipment, and the like, to provide those pieces of information in response to a request from outside and provide firmware handled by a maker to the user.

The order reception management server 70 is a server computer for managing the situation of industrial equipment order reception from the respective users. The production management server 80 is a server computer for managing the production situation of each industrial equipment an order for which has been received by the order reception management server 70. The failure management server 90 is a server computer for managing failures in industrial equipments that have been purchased by the respective users.

Programs and pieces of data described as being stored in the respective devices of the industrial equipment management system S may be stored in information storage media connected to the devices, or may be acquired from external devices via the network N. The hardware configurations of the respective devices of the industrial equipment management system S are not limited to the example given above, and pieces of common hardware can be used for the devices. The same applies to the devices of the industrial equipment management system S for which a detailed description on the hardware configuration is omitted for the sake of simplifying the description of the embodiment.

This embodiment describes processing that is executed in the industrial equipment management system S, taking as an example a case where a user (an individual) working for a corporate business belongs to at least one of a plurality of groups (e.g., departments or projects) present in the corporate business. On the cloud server 60, a storage area is allocated for each individual ID by which each user is identified uniquely and for each group ID by which each group is identified uniquely. In the following description, the storage area on the cloud server 60 that is allocated to each individual ID is referred to as individual area, and the storage area on the cloud server 60 that is allocated to each group ID is referred to as group area.

When a user performs user registration to the industrial equipment management system S, the individual ID and individual area of the user are generated first. The user then inputs equipment information (for example, parameters adjusted by himself/herself) of an industrial equipment to register the equipment information in his/her individual area. Each user is allowed to view equipment information stored in his/her own individual area, but is restricted from viewing equipment information that is stored in other users' individual areas.

In this embodiment, each user can share equipment information stored in his/her own individual area with other users by copying the equipment information to a group area that is allocated to the group ID of a group to which the user belongs. Restrictions are put on equipment information stored in each group area so as to prevent the copying of the equipment information to an individual area. Each user is restricted from taking equipment information that has been copied to the group area by another user at will. For instance, the chance of a user who is leaving the group (e.g., a user who is quitting the corporate business) taking other users' know-bows improperly is reduced, thereby enhancing the security. The following is a detailed description of this technology.

[Functions Implemented by the Industrial Equipment Management System]

Figure 2:
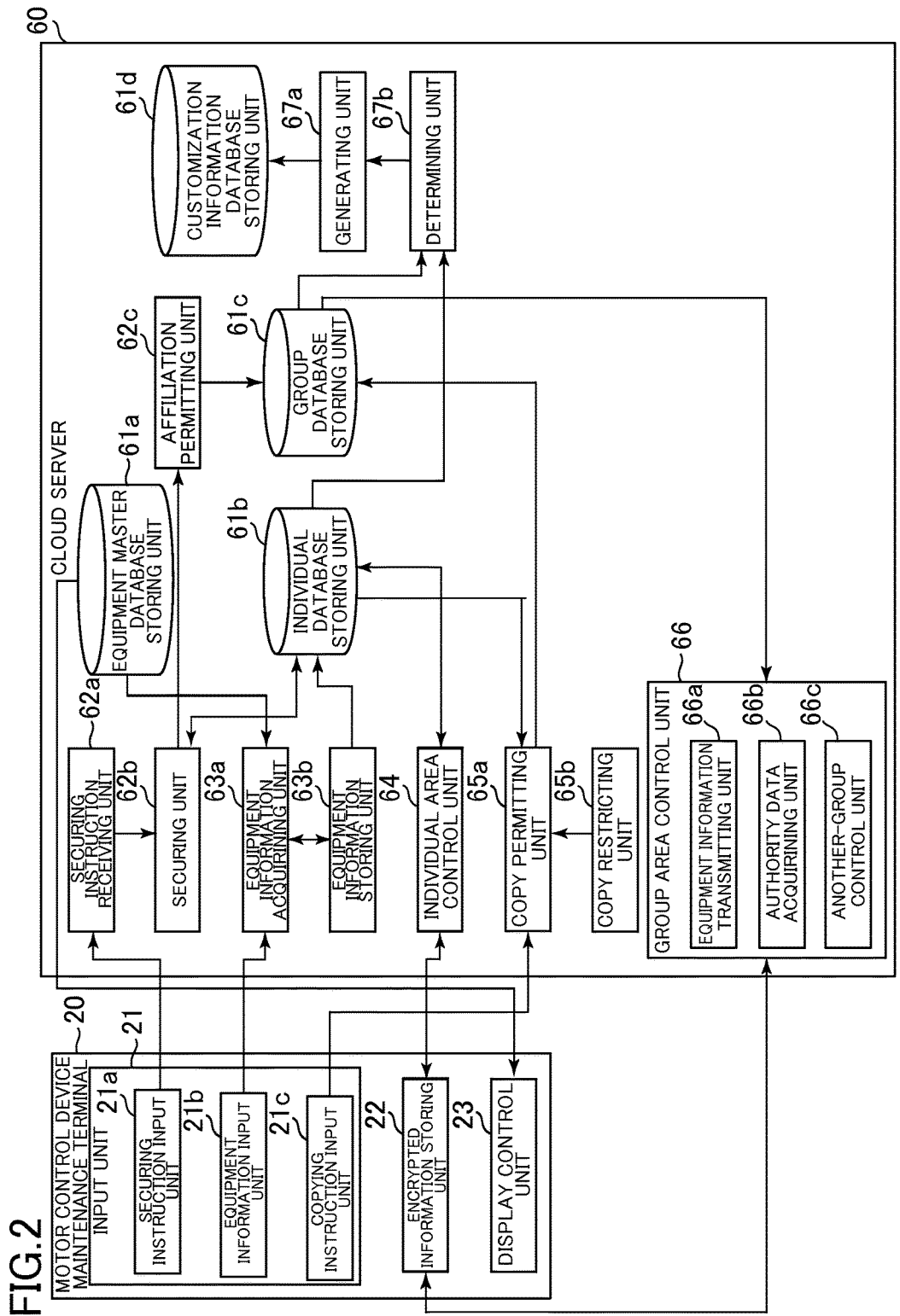
FIG. 2 is a function block diagram illustrating functions that are implemented in the industrial equipment management system.

FIG. 2 is a functional block diagram illustrating functions implemented by the industrial equipment management system S. Here, a description is given of functions implemented by the motor control device maintenance terminal 20 and the cloud server 60.

[Functions Implemented by the Motor Control Device Maintenance Terminal]

The motor control device maintenance terminal 20 includes an input unit 21, and an encrypted information storing unit 22, and a display control unit 23. The input unit 21 is implemented mainly by the CPU 20*a* and the operating unit 20*e*. The encrypted information storing unit 22 is implemented mainly by the storage 20*b*. The display control unit 23 is implemented mainly by the CPU 20*a*.

[Input Unit]

The input unit 21 receives various inputs made by a user. The input unit 21 includes a securing instruction input unit 21*a*, an equipment information input unit 21*b*, and a copying instruction input unit 21*c*.

The securing instruction input unit 21*a* receives an input of a user's instruction to secure an individual area. The securing instruction can be issued by given operation. In this embodiment, where a user's action of performing user registration to the industrial equipment management system S triggers the generation of an individual area for the user, the securing instruction input unit 21*a* receives a user registration input made by a user.

The equipment information input unit 21*b* receives an input of equipment information made by a user. The equipment information input unit 21*b* receives, from each user, an input of equipment information to be registered in the individual area of the user. For example, the equipment information input unit 21*b* receives an input of a serial number which is individual identification information of an industrial equipment and equipment information (e.g., the name of a file that stores parameters or a character string indicating equipment condition) of the industrial equipment. The equipment information input unit 21*b* may acquire setting information stored in a storage of an industrial equipment and transmit the setting information to the cloud server 60, thereby enabling an equipment information acquiring unit 63*a*, which is described later, to acquire setting information stored in a storage of an industrial equipment.

The copying instruction input unit 21*c* receives from each user an instruction to copy equipment information that is stored in the user's individual area to a group area. This instruction can be issued by given operation. For example, the copying instruction input unit 21*c* receives the specification of equipment information to be copied, and the specification of the group ID of a group area that is the copy destination.

[Encrypted Information Storing Unit]

The encrypted information storing unit 22 stores encrypted equipment information. For example, equipment information is transmitted/received in an encrypted state over the network N to be temporarily stored in the encrypted information storing unit 22. Encrypting equipment information prevents the leakage of know-how in the event of electrical interception on the network N. An additional, and particular purpose of encrypting equipment information in this embodiment is to prevent a user with malicious intent from taking other users' know-hows freely by storing equipment information encrypted in the encrypted information storing unit 22 when the equipment information is displayed and thus allowing the user to acquire only encrypted equipment information if the user refers to the memory of his/her own terminal.

[Display Control Unit]

The display control unit 23 controls the display 20*d* so that various screens are displayed on the display 20*d*. For example, the display control unit 23*d* in this embodiment, where encrypted equipment information is stored in the encrypted information storing unit 22, decrypts the stored equipment information and displays the decrypted equipment information. The display control unit 23 here deploys the decrypted information in the non-volatile memory of the encrypted information storing unit 22, details of which are described later. A decryption key file for decrypting encrypted equipment information is stored in the encrypted information storing unit 22 or other storage areas.

Figure 3:
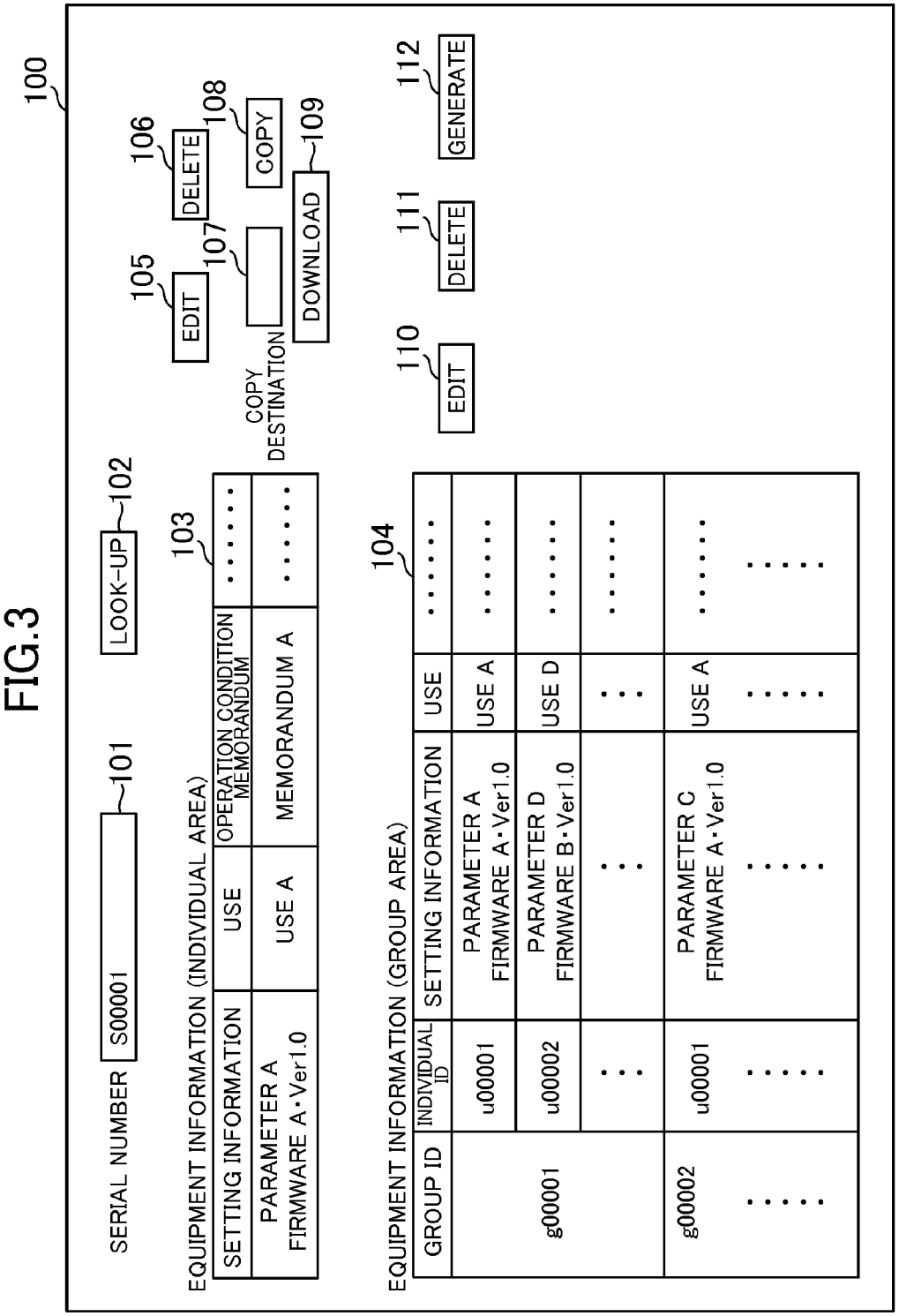
FIG. 3 is an example of a display screen displaying equipment information.
Figure 7:
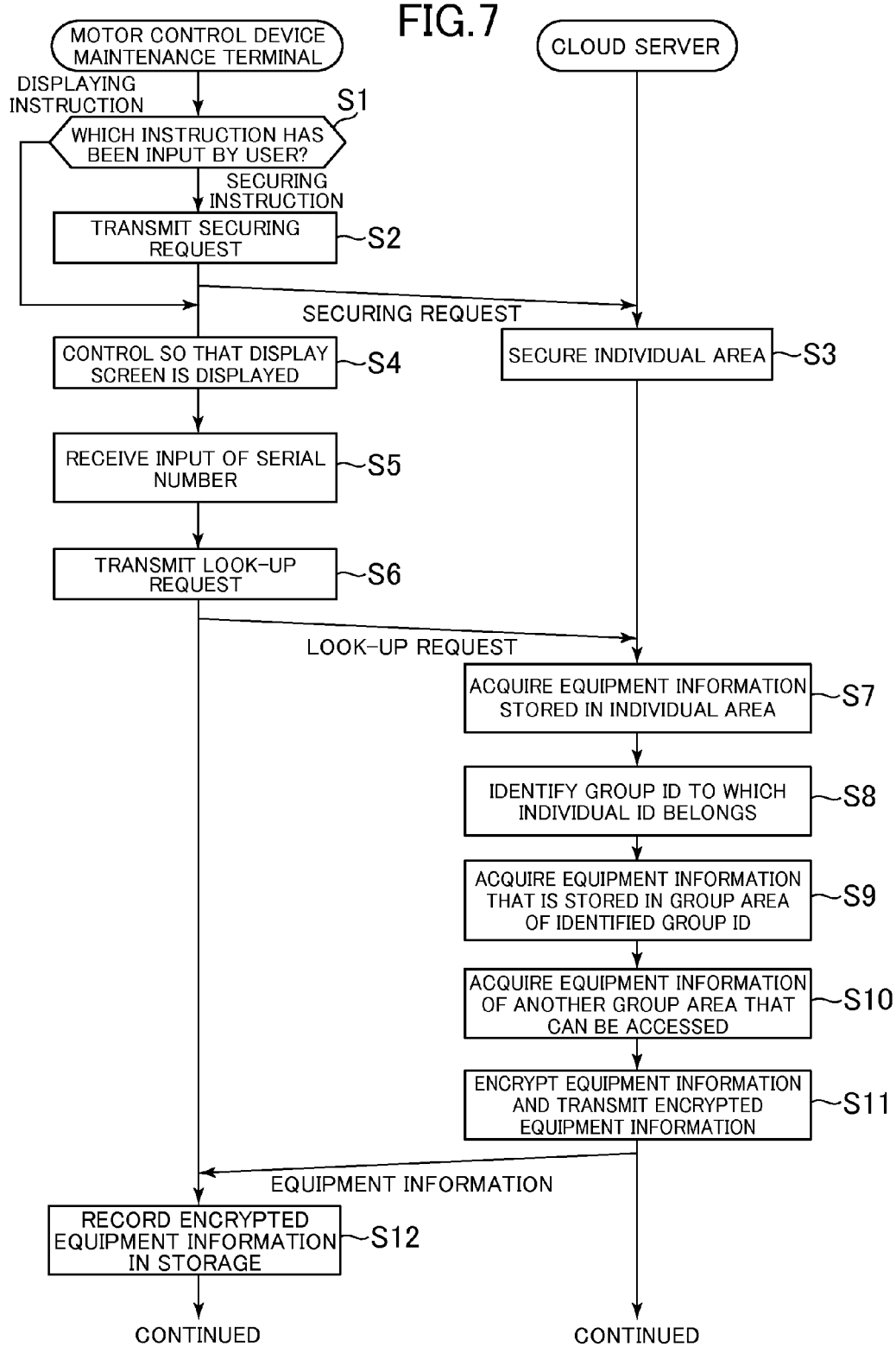
FIG. 7 is a diagram illustrating an example of processing that is executed in the industrial equipment management system.

FIG. 3 is an example of a display screen that displays equipment information. When a user inputs a serial number in an input form 101 and selects a look-up button 102, equipment information that is associated with the input serial number is displayed in display areas 103 and 104. The display area 103 displays equipment information stored in the user's individual area. The display area 104 displays equipment information stored in a relevant group area.

The user can edit the equipment information displayed in the display area 103 by making an input with respect to the equipment information and then selecting an edit button 105. In the case where equipment information that is associated with a serial number input in the input form 101 is not registered in the user's individual area, the user can newly register equipment information about an industrial equipment that has the serial number in his/her individual area by selecting the edit button 105.

The user can delete the equipment information displayed in the display area 103 from the individual area by selecting a delete button 106. The user can also copy the equipment information displayed in the display area 103 to a group area by specifying the group ID of the group in a copy destination specifying form 107 and then selecting a copy button 108. The user can further select a download button 109 to download a file of the equipment information displayed in the display area 103 onto the motor control device maintenance terminal 20 and save the file on the motor control device maintenance terminal 20.

When the user makes an input with respect to one of the pieces of equipment information displayed in the display area 104 and selects an edit button 110, the user can edit the piece of equipment information stored in the group area. The user can also delete one of the pieces of equipment information displayed in the display area 104 from the group area by selecting the piece of equipment information and selecting a delete button 111.

In this embodiment, equipment information stored in an individual area can thus be displayed, edited, deleted, copied to a group area, and downloaded and saved, whereas equipment information stored in a group area can be displayed, edited, and deleted but cannot be copied to an individual area and downloaded onto the motor control device maintenance terminal 20.

In this embodiment, the user can also select apiece of equipment information displayed in the display area 104 and then select an generation button 112 to generate a setting information ID (details of which are described later) for producing the industrial equipment based on setting information that is included in the piece of equipment information. Setting information is information for operating an industrial equipment that can be adjusted by a user. For instance, parameters and a program (e.g., the type and version of firmware) that are set in an industrial equipment correspond to setting information.

[Functions Implemented by the Cloud Server]

The cloud server 60 includes an equipment master database storing unit 61a, an individual database storing unit 61b, a group database storing unit 61c, a customization information database storage unit 61d, a securing instruction receiving unit 62a, a securing unit 62b, an affiliation permitting unit 62c, an equipment information acquiring unit 63a, an equipment information storing unit 63b, an individual area control unit 64, a copy permitting unit 65a, a copy restricting unit 65b, a group area control unit 66, a generating unit 67a, and a determining unit 67b. The equipment master database storing unit 61a, the individual database storing unit 61b, and the group database storing unit 61c are implemented mainly by the storage 60b, and the other functions are each implemented mainly by the CPU 60a.

[Database Storing Units]

The equipment master database storing unit 61a stores an equipment master database which shows basic information of industrial equipments. The equipment master database stores a serial number and equipment information that is managed by the maker in association with each other. A piece of equipment information managed by the maker stores information unique to a device, for example, various types of information for identifying the physical configuration of the device (e.g., a device name, a model, and a device description about specifications), and the type and version information of firmware. The type and version information of firmware are changed suitably when the firmware is downloaded or updated. The rest of the information is information that does not change after the industrial equipment is purchased, and therefore is not updated in principle. The display screen of FIG. 3 which is denoted by 100 may display equipment information stored in the equipment master database when a serial number is input in the input form 101, although the illustration thereof is omitted from FIG. 3.

The individual database storing unit 61b stores a user management database and an individual equipment information database. The user management database stores, for each user, the user's individual ID and basic information (e.g., the name and a mail address) in association with each other. When a user performs given user registration, a new record is created in the user management database, and basic information input by the user who has performed the user registration is stored in the created record.

FIG. 4 is a table showing an example of the individual equipment information database. As shown in FIG. 4, the individual equipment information database stores an individual ID, a serial number, and equipment information that is input by a user in association with one another. The individual equipment information database in this embodiment corresponds to individual areas of the respective individual IDs. Each user can register equipment information in a record of the individual equipment information database that is associated with his/her individual ID.

A piece of equipment information stored in the individual equipment information database stores setting information of an industrial equipment (e.g., parameters adjusted by the user and specified firmware), the user's memorandum indicating the operation condition of the industrial equipment, the name of a facility in which the industrial equipment is used, a name given by the user, the use of the industrial equipment, and the like. Items (field names) constituting a piece of equipment information may be set freely and separately for each user.

The group database storing unit 61c stores a group management database and a group equipment information database. The group management database stores, for each group, the group ID and basic information (e.g., a group name and the name of a corporate business in which the group exists) of the group. When a user performs given operation for generating a group, for example, a new record is created in the group management database, and the group ID and basic information of the group are stored in the created record.

FIG. 5 is a table showing an example of the group equipment information database. As shown in FIG. 5, the group equipment information database stores, in association with one another, a group ID, an individual ID list showing individual IDs that belong to the group ID, authority data which defines access authority of the group ID, a serial number, the individual IDs that belong to the group ID, and pieces of equipment information copied by users who have the listed individual IDs. The group equipment information database in this embodiment corresponds to group areas of the respective group IDs. Because a piece of equipment information here contains setting information of an industrial equipment, a portion of a group area that stores setting information corresponds to a setting information storing area.

The group equipment information database may be designed so that individual IDs included in the individual ID list can be changed by the respective users' operation, or can be changed only by some users who have management authority. A piece of authority data that is associated with a group ID may define other group IDs of group areas that are accessible with the use of the group ID, or may define another group ID that can be used to access the group area of the group ID. An individual ID that is associated with a piece of equipment information in the group equipment information database may indicate a user who has copied the piece of equipment information, or may indicate a user who has edited the piece of information most recently. The individual equipment information database may also show a history recording the individual IDs of users who have edited the piece of equipment information in the case where the piece of equipment information is edited a plurality of times.

The customization information database storing unit 61*d* stores a customization information database which stores information about customization requested when an industrial equipment is ordered. FIG. 6 is a table showing an example of the customization information database. As shown in FIG. 6, the customization information database associates, with one another, the group ID of a group area that stores a relevant piece of setting information, the individual ID of a user who has requested to generate a setting information ID, the setting information ID, and the piece of setting information. In this embodiment, a setting information ID is generated for a piece of setting information stored in a group area. When a user orders an industrial equipment with a setting information ID specified, an industrial equipment in which a piece of setting information that is associated with the setting information ID is set is produced.

[Securing Instruction Receiving Unit]

The securing instruction receiving unit 62*a* receives from the securing instruction input unit 21*a* a securing instruction given by a user to secure an individual area.

[Securing Unit]

The securing unit 62*b* secures an individual area on the cloud server 60. When the securing instruction receiving unit 62*a* receives a securing instruction, the securing unit 62*b* generates a record (individual area) in the individual equipment information database that is associated with the individual ID of a user who has generated the securing instruction.

[Affiliation Permitting Unit]

The affiliation permitting unit 62*c* permits an individual ID to belong to a group ID after a relevant individual area is secured. For instance, after a user performs user registration and an individual area is created in the individual equipment information database, the affiliation permitting unit 62*c* permits the user's individual ID to belong to a group ID, and restricts any individual ID for which an individual area has not been created to belong to a group ID.

[Equipment Information Acquiring Unit]

The equipment information acquiring unit 63*a* acquires equipment information that has been input by a user (e.g., setting information). The equipment information acquiring unit 63*a* here acquires apiece of equipment information input to the display area 103 by a user, the user's individual ID, and the serial number of an industrial equipment that is associated with the piece of equipment information.

[Equipment Information Storing Unit]

The equipment information storing unit 63 stores a piece of equipment information acquired by the equipment information acquiring unit 63*a* (e.g., setting information) in the individual equipment information database in association with the individual ID of a user who has input the piece of equipment information. The equipment information storing unit 63*b* stores the equipment information acquired by the equipment information acquiring unit 63*a* in a record that is associated with the individual ID of the user who has input the equipment information and the serial number of the relevant industrial equipment.

[Individual Area Control Unit]

The individual area control unit 64 controls access to an individual area, which is a storage area on the cloud server 60 that is associated with an individual ID, based on the individual ID. Access here means viewing, editing, and deleting data that is stored in a storage area. For instance, the individual area control unit 64 controls access to each individual area by granting access to an individual ID that is associated with the individual area, and denying access to another individual ID.

[Copy Permitting Unit]

The copy permitting unit 65*a* permits the copying of equipment information that is stored in an individual area to a group area. For instance, the copy permitting unit 65*a* copies equipment information stored in an individual area of an individual ID to a group area of a group ID to which the individual ID belongs, in response to operation performed by a user who has the individual ID, and stores the duplicate data.

[Copy Restricting Unit]

The copy restricting unit 65*b* restricts the copying of equipment information about an industrial equipment that is stored in a group area to an individual area. The copy restricting unit 65*b* here restricts the copying of setting information that is stored in a setting information storing area to an individual area because each group area contains a setting information storing area. For example, rejecting operation for copying, or canceling copying processing when operation for copying is received, is equivalent to restricting copying.

In this embodiment, equipment information is temporarily stored on the motor control device maintenance terminal 20 when the equipment information is to be displayed. The copy restricting unit 65*b* meanwhile restricts the copying of equipment information that is not encrypted (i.e., equipment information in plaintext) to a storage such as the encrypted information storing unit 22 of the motor control device maintenance terminal 20 (operating terminal). In other words, the copy restricting unit 65*b* restricts users from saving equipment information that is stored in a group area on the motor control device maintenance terminal 20 in a decrypted state.

To give a more concrete example, when equipment information is downloaded onto the encrypted information storing unit 22 in order to display the equipment information in the display screen 100, recording the encrypted equipment information in the non-volatile memory of the encrypted information storing unit 22 is allowed, but data that is generated by decrypting the encrypted equipment information in order to display the equipment information is recorded in the volatile memory. The decrypted data is erased from the volatile memory at a given timing (e.g., when the motor control device maintenance terminal 20 is powered off or when the display screen 100 finishes displaying), thereby effectively preventing a user with malicious intent from directly extracting the decrypted data and saving the data as a file. The industrial equipment management system S may be designed so that encrypted equipment information necessary for display is recorded in the volatile memory as well.

[Group Area Control Unit]

The group area control unit 66 controls access to a group area, which is a storage area on the cloud server 60 that is associated with a group ID, based on an individual ID that belong to the group ID. The group area control unit 66 controls access to equipment information stored in each group area by granting access to an individual ID that belongs to the group ID of the group area, and denying access to an individual ID that does not belong to any group ID.

The group area control unit 66 in this embodiment includes an equipment information transmitting unit 66a, an authority data acquiring unit 66b, and an another-group control unit 66c.

The equipment information transmitting unit 66a transmits encrypted equipment information to the motor control device maintenance terminal 20. Each piece of equipment information may be stored in an encrypted state in the databases, or may be encrypted with a given encryption key when transmitted by the equipment information transmitting unit 66a.

The authority data acquiring unit 66b acquires data that defines access authority between group IDs. The authority data acquiring unit 66b here acquires the authority data stored in the group equipment information database.

The another-group control unit 66c controls, based on the authority data, access to equipment information that a group area associated with one group ID stores that is based on an individual ID belonging to another group ID. For instance, based on the authority data, the another-group control unit 66c restricts (prohibits) access that is based on an individual ID belonging to another group ID.

More specifically, in the case where the authority data defines, for each group ID, another group ID that is allowed to access a group area associated with the group ID, the another-group control unit 66c grants access to equipment information stored in a group area that is associated with one group ID to an individual ID that belongs to another group ID defined in the authority data of the one group ID, and restricts access to the rest of individual IDs.

In the case where the authority data defines, for each group ID, another group ID of group areas that are accessible with the use of the group ID, on the other hand, the another-group control unit 66c grants an individual ID that belongs to one group ID access to equipment information stored in group areas of another group that is defined in the authority data of the one group ID, and restricts access to the rest of individual IDs.

[Generating Unit]

The generating unit 67a generates a setting information ID for identifying setting information. A setting information ID is identification information for uniquely identifying each piece of setting information stored in a group area, and is generated under a given generation rule so as to avoid duplication with another setting information ID. The generating unit 67a stores a setting information ID generated for a piece of setting information in the customization information database in association with the group ID of a group area in which the piece of setting information is stored, and the individual ID of a user who has instructed to generate the setting information ID.

[Determining Unit]

The determining unit 67b determines, based on an individual ID or a group ID, whether to allow the generating unit 67a to generate a setting information ID. Here, the authority to generate a setting information ID is given to an individual ID or a group ID that is determined in advance. For instance, an individual ID or a group ID may be defined for each group as one having the authority to assign a setting information ID to equipment information that is stored in a group area of the group ID.

The determining unit 67b identifies the individual ID of a user who has instructed to generate a setting information ID for a piece of setting information, or identifies a group ID to which the individual ID belongs, and determines whether or not the individual ID, or the group ID to which the individual ID belongs, has the generating authority. For instance, the determining unit 67b determines whether or not the identified individual ID, or the group ID to which the identified individual ID belongs, is defined as an ID having the generating authority for the group ID of a group area that stores the piece of setting information for which a setting information ID is instructed to be generated.

[Processing Executed in the Industrial Equipment Management System]

FIGS. 7 to 10 are diagrams illustrating an example of processing that is executed in the industrial equipment management system S. The respective function blocks are implemented by executing the processing described below. The processing illustrated in FIGS. 7 to 10 is executed by the CPU 20a of the motor control device maintenance terminal 20 and the CPU 60a of the cloud server 60 by respectively operating as programmed by a program that is stored in the storage 20b and a program that is stored in the storage 60b.

First, the CPU 20a in the motor control device maintenance terminal 20 identifies an instruction input from the operating unit 20e by a user (S1). It is assumed here for the sake of simplifying description that the user issues one of an individual area securing instruction and an equipment information displaying instruction.

In the case where the input instruction is an individual area securing instruction (S1: securing instruction), the CPU 20a transmits an individual area securing request to the cloud server 60 (S2). In this embodiment, where a user's instruction to execute user registration is equivalent to an instruction to secure an individual area, the user's basic information (e.g., a mail address and the name) necessary for user registration is transmitted along with the securing request in Step S2.

The cloud server 60 receives the securing request and the CPU 60a secures an individual area for the user in the individual equipment information database (S3). Because user registration is equivalent to a securing request here as described above, the CPU 60a first generates an individual ID and registers the individual ID in the user management database in association with the basic information input by the user. The CPU 60a then adds a record associated with the individual ID to the individual equipment information database, thereby securing a storage area in which equipment information is stored.

In the case where an instruction to display equipment information is given (S1: displaying instruction), on the other hand, the CPU 20a controls the display 20d so that the display screen 100 is displayed on the display 20d (S4). The CPU 20a receives a serial number input in the input form 101 (S5). With the selecting of the look-up button 102, the CPU 20a transmits an equipment information look-up request to the cloud server 60 along with the serial number input in the input form 101 (S6). When information is transmitted from the motor control device maintenance terminal 20 to the cloud server 60, the user's individual ID (stored in, for example, the storage 20b) is transmitted as well.

The cloud server 60 receives the look-up request and the CPU 60a acquires equipment information stored in a relevant individual area (S7). In Step S7, the CPU 60a acquires equipment information stored in a record of the individual equipment information database that holds the individual ID of the user who has made the look-up request and the input serial number.

The CPU 60a refers to the group equipment information database to identify a group ID to which the individual ID of the user who has made the look-up request belongs (S8). In Step S8, the CPU 60a identifies a group ID whose individual ID list includes the individual ID of the user who has made the look-up request.

The CPU 60a acquires equipment information that is stored in a group area of the group ID identified in Step S8 (S9). In Step S9, the CPU 60a acquires equipment information stored in a record of the group equipment information database that holds the group ID identified in Step S8.

Based on the authority data of the group ID identified in Step S8, the CPU 60a acquires equipment information of another group area that are accessible (S10). In Step S10, the CPU 60a identifies the group ID of a group area that can be accessed with the user's individual ID based on the authority data, and acquires equipment information stored in the group area of the identified group ID.

The CPU 60a encrypts the pieces of equipment information acquired in Steps S7, S9, and S10, and transmits the encrypted equipment information to the motor control device maintenance terminal 20 (S11). The CPU 60a uses an encryption key stored in the storage 60b in advance.

Figure 8:
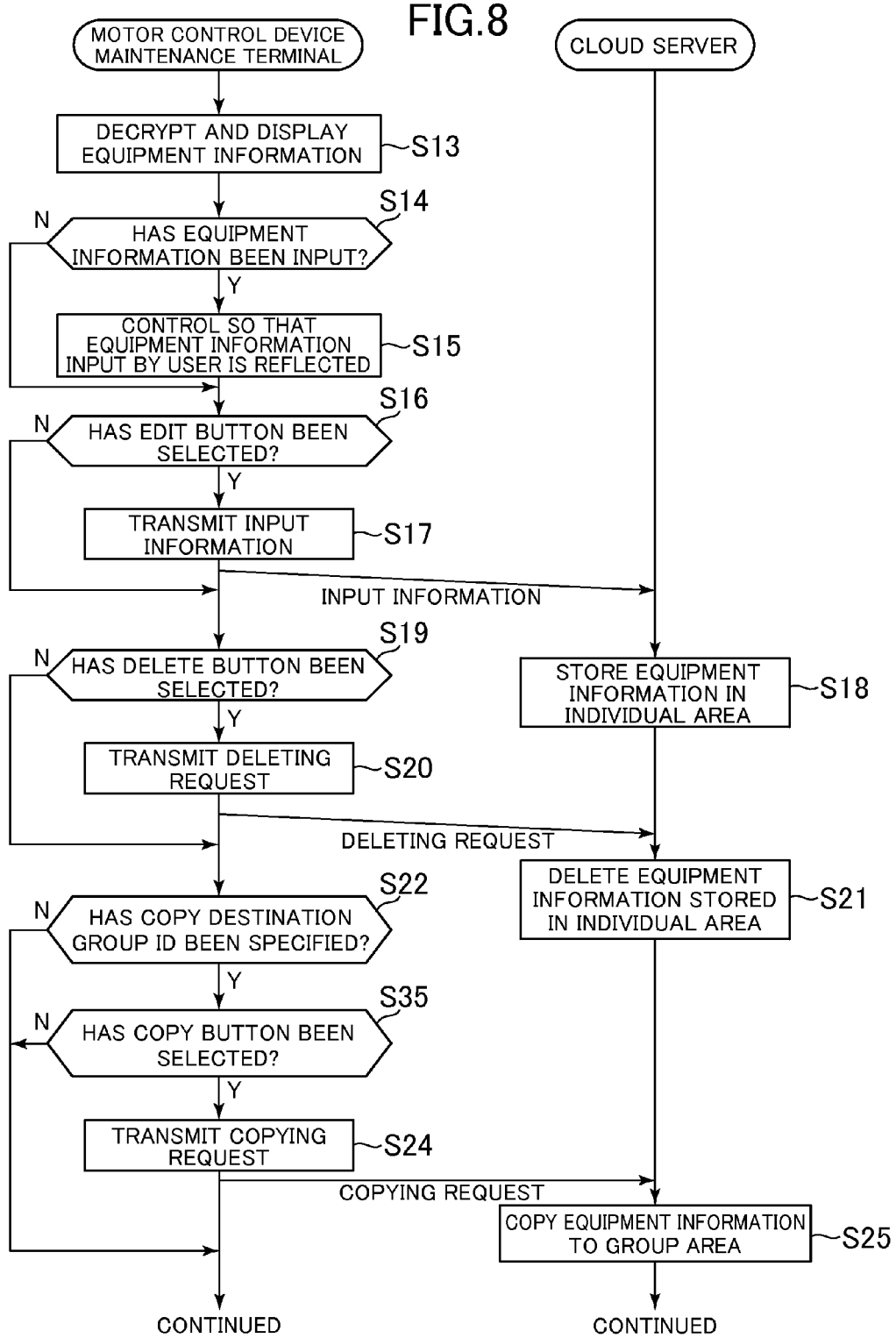
FIG. 8 is a diagram illustrating the example of the processing that is executed in the industrial equipment management system.

The motor control device maintenance terminal 20 receives the encrypted equipment information, and the CPU 20a records the encrypted equipment information in the storage 20b (S12). Referring now to FIG. 8, the CPU 20a uses a given decryption key to decrypt the equipment information stored in the storage 20b, and displays the decrypted information in the display areas 103 and 104 (S13). The CPU 20a stores the decrypted equipment information in the RAM of the storage 20b which is a volatile memory as described above. The CPU 20a determines whether or not equipment information has been input to the display area 103 (S14).

When it is determined that equipment information has been input (S14: Y), the CPU 20a controls the display screen 100 so that the equipment information input by the user is reflected in the display area 103 (S15). The CPU 20a determines whether or not the edit button 105 has been selected (S16). When it is determined that the edit button 105 has been selected (S16: Y), the CPU 20a transmits a request to edit the equipment information and the information input to the display area 103 to the cloud server 60 (S17).

The cloud server 60 receives the editing request and the input information, and the CPU 60a stores the equipment information in the individual area based on the information input by the user (S18). In Step S18, the CPU 20a stores the equipment information input by the user in a record of the individual equipment information database that holds an individual ID and a serial number that match the user's individual ID and the input serial number.

The CPU 20a determines whether or not the delete button 106 has been selected (S19). When it is determined that the delete button 106 has been selected (S19: Y), the CPU 20a transmits a request to delete the equipment information stored in the individual area to the cloud server 60 (S20).

The cloud server 60 receives the deleting request and the CPU 60a deletes the equipment information stored in the individual area (S21). In Step S21, the CPU 60a deletes equipment information from a record of the individual equipment information database that holds an individual ID and a serial number that match the user's individual ID and the input serial number.

The CPU 20a determines whether or not a copy destination group ID has been specified in the copy destination specifying form 107 (S22). When it is determined that a copy destination group ID has been specified (S22: Y), the CPU 20a determines whether or not the copy button 108 has been selected (S23). When it is determined that the copy button 108 has been selected (S23: Y), the CPU 20a transmits a request to copy the equipment information stored in the individual area to the cloud server 60 (S24). In Step S24, the CPU 20a transmits a serial number that is associated with the equipment information to be copied and the group ID specified as the copy destination.

The cloud server 60 receives the copying request, and the CPU 60a copies the equipment information specified by the user to a group area of the group ID specified by the user (S25). In Step S25, the CPU 60a stores the equipment information to be copied, along with the individual ID of the user who has instructed to copy, in a record of the group equipment information database that holds a group ID and a serial number that match the copy destination group ID and the serial number associated with the equipment information to be copied. In the case where there is already equipment information stored in the record, the CPU 60a overwrites the existing equipment information with the specified equipment information.

Figure 9:
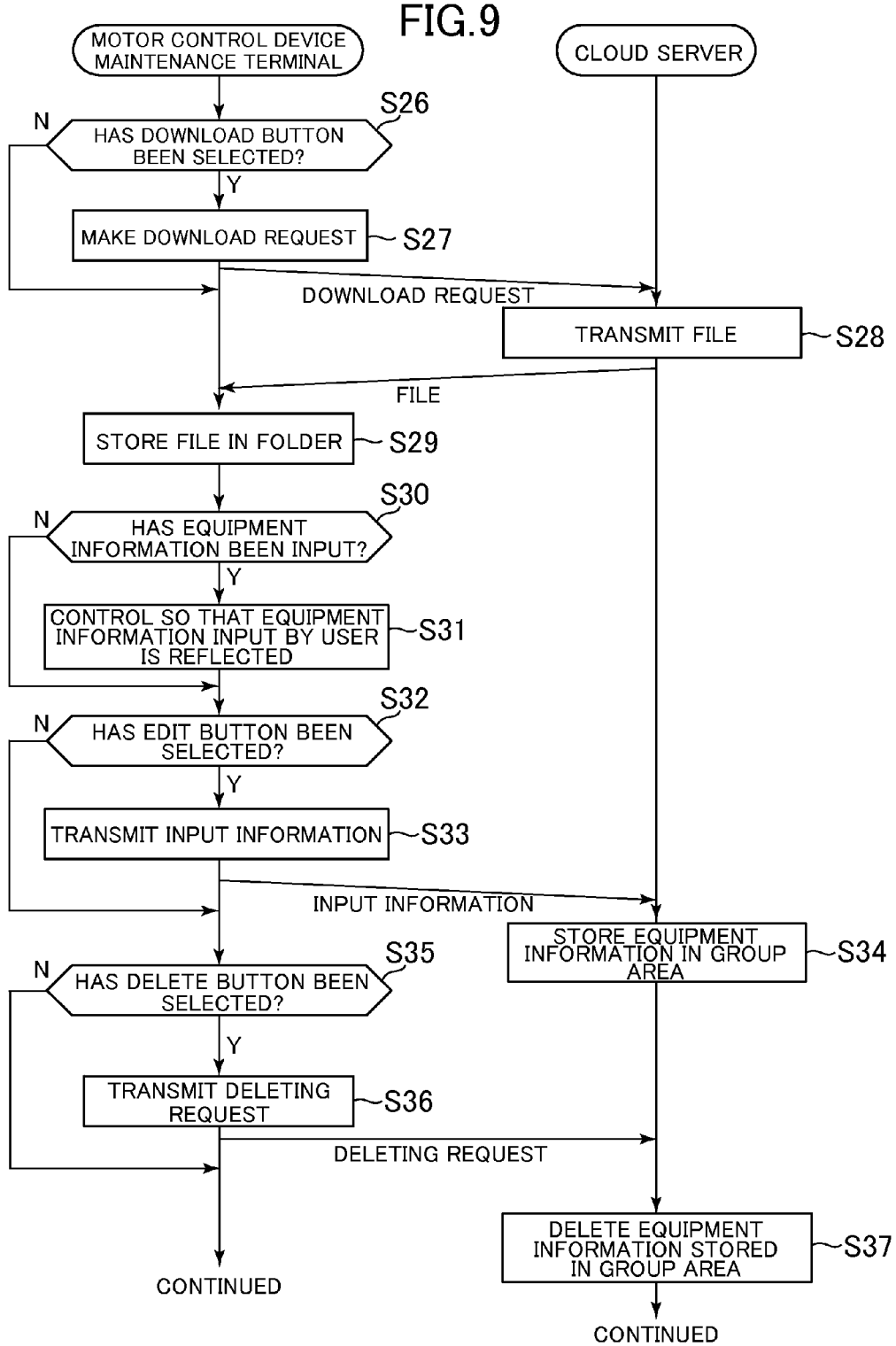
FIG. 9 is a diagram illustrating the example of the processing that is executed in the industrial equipment management system.

Referring now to FIG. 9, the CPU 20a determines whether or not the download button 109 has been selected (S26). When it is determined that the download button 109 has been selected (S26: Y), the CPU 20a transmits a download request to the cloud server 60 (S27). In Step S27, the CPU 20a transmits a serial number that is associated with equipment information to be downloaded.

The cloud server 60 receives the download request and the CPU 60a transmits a file of the equipment information to the motor control device maintenance terminal 20 (S28). In Step S28, the CPU 60a transmits a file of equipment information stored in a record of the individual equipment information database that holds an individual ID and a serial number that match the individual ID of the user who has made the download request and the serial number associated with the equipment information to be downloaded.

The CPU 20a in the motor control device maintenance terminal 20 stores the received file in a given folder (S29).

The CPU 20a determines whether or not equipment information has been input to the display area 104 (S30). When it is determined that equipment information has been input (S30: Y), the CPU 20a controls the display screen 100 so that the equipment information input by the user is reflected in the display area 104 (S31). The CPU 20a determines whether or not the edit button 110 has been selected (S32).

When it is determined that the edit button 110 has been selected (S32: Y), the CPU 20a transmits a request to edit equipment information stored in a group area to the cloud server 60 (S33). In Step S33, the CPU 20a transmits information for identifying the selected equipment information (e.g., a group ID and an individual ID that are associated with the equipment information) and the editing request.

The cloud server 60 receives the editing request, and the CPU 60a stores equipment information in the group equipment information database based on the information input by the user (S34). In Step S34, the CPU 60a stores the equipment information input by the user in a record of the group equipment information database that holds a group ID, a serial number, and an individual ID that match the group ID, serial number, and individual ID of the equipment information to be edited.

The CPU 20a determines whether or not the delete button 111 has been selected (S35). When it is determined that the delete button 110 has been selected (S35: Y), the CPU 20a transmits a request to delete equipment information stored in a group area to the cloud server 60 (S36). In Step S36, the CPU 20a transmits identification information for identifying the selected equipment information (e.g., a group ID, a serial number, and an individual ID that are associated with the equipment information) and the deleting request.

The cloud server 60 receives the deleting request and the CPU 60a deletes the equipment information stored in the group area (S37). In Step S37, the CPU 60a deletes equipment information from a record that holds a group ID, a serial number, and an individual ID that match the group ID, serial number, and individual ID of the equipment information to be deleted.

Figure 10:
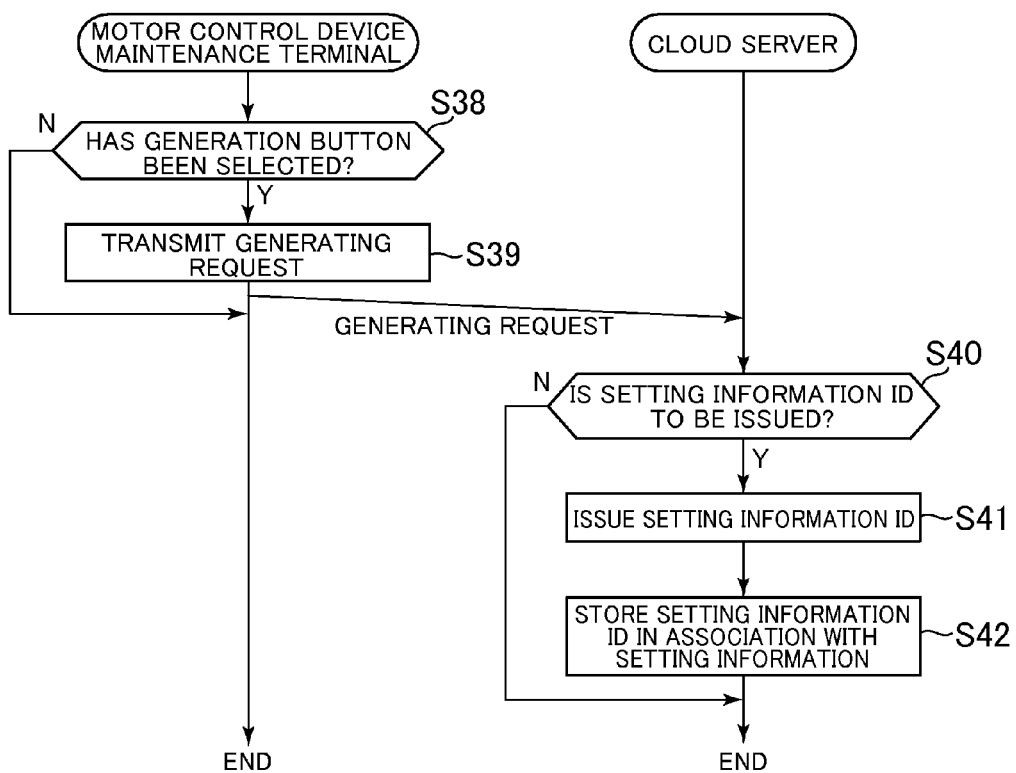
FIG. 10 is a diagram illustrating the example of the processing that is executed in the industrial equipment management system.

Referring now to FIG. 10, the CPU 20a determines whether or not the generation button 112 has been selected (S38). When it is determined that the generation button 112 has been selected (S38: Y), the CPU 20a transmits a request to generate a setting information ID to the cloud server 60 (S39). In Step S39, the CPU 20a transmits information for identifying setting information for which a setting information ID is to be generated (e.g., a group ID and an individual ID that are associated with setting information for which the generation button 112 has been selected).

The cloud server 60 receives the setting information ID generating request, and the CPU 60a determines whether to generate a setting information ID based on the individual ID of the user who has made the generating request, or on a group ID to which the individual ID belongs (S40). For example, data that indicates the individual ID or group ID of an individual or a group authorized to generate a setting information ID is stored in the storage 60b in advance, and, in Step S40, the CPU 60a determines whether or not the individual ID of the user who has made the generating request or a group ID to which the individual ID belongs is included among the individual ID or the group ID indicated by the data.

When it is determined that a setting information ID is to be generated (S40: Y), the CPU 60a generates a setting information ID to the setting information for which the generating request has been made (S41). In Step S41, the CPU 60a generates a setting information ID under a given numbering rule. The CPU 60a stores the setting information ID generated in Step S41 in the customization information database in association with the setting information (S42). In Step S42, the CPU 60a creates a new record in the customization information database, and stores in the created record the group ID of a group area in which the setting information is stored, the individual ID of the user who has made the generating request, the generated setting information ID, and the setting information.

Once a setting information ID is generated in Step S41, the user can place an order for an industrial equipment based on the setting information ID. For instance, the order reception management server 70 receives basic information of the industrial equipment ordered by the user (e.g., the model, specifications, and the order quality of the industrial equipment) and the setting information ID specified by the user, and the production management server 80 then produces the industrial equipment based on the received information. Specifically, the production management server 80 produces (sets) the industrial equipment ordered by the user based on setting information that is associated with the setting information ID specified by the user. The user thus receives an industrial equipment that is produced based on the setting information. The equipment master database in this case may be designed so that the serial number of the industrial equipment produced and the setting information ID used in the production are managed in association with each other.

According to the industrial equipment management system S described above, equipment information stored in a group area is prevented from being copied to an individual area, thereby effectively eliminating the risk of improper leakage of users' know-hows. In the field of industrial equipments, in particular, where each user of an industrial equipment fully draws upon his/her own know-how in adjusting setting information of the industrial equipment and keeping track of the condition of the industrial equipment, restricting the copying of equipment information to an individual area while allowing the know-how to be shared with other users in a group area reduces the risk of improper taking of the know-how by a resignee or the like, and accordingly improves the security of equipment information.

The industrial equipment management system S, which allows each user to copy equipment information stored in the user's individual area to a group area, enables the user to share his/her know-how with other users in the same group. In the field of industrial equipments, in particular, where most users adjust industrial equipments on their own, allowing a user to register equipment information in his/her individual area first and then select know-how to be registered in a group area as one to be shared with other users improves users' convenience in sharing know-bows.

The industrial equipment management system S, which restricts the copying of setting information stored in a group area to an individual area, reduces the risk of improper leakage of setting information registered by the respective users. Of a piece of equipment information associated with a user, the user's know-how is condensed in setting information in particular. The risk of improper leakage of know-bows that are important to the respective users is thus reduced.

The industrial equipment management system S, which determines whether to generate a setting information ID based on an individual ID or a group ID, is also capable of allowing only particular people to generate a setting information ID. This effectively reduces the risk of, for example, inadvertently letting a user generate a setting information ID for setting information that is full of another user's know-bows at will and placing an order for an industrial equipment in which the know-bows are set.

Another advantage of the industrial equipment management system S, where each user is allowed to apply for affiliation to a group ID after an individual area is secured for the user, is that the user can register equipment information in his/her individual area prior to the affiliation to a group ID. Some users may wish to first check the operation of an industrial equipment by himself/herself and register equipment information in his/her individual area with the user being the only one who can review the equipment information, before sharing information with other users who work for the same corporate business as himself/herself. Therefore, by allowing a user to apply for affiliation to a group ID after an individual area is secured for the user, the user can register equipment information to his/her individual area first and users' convenience is improved. Furthermore, storing equipment information for each individual ID in the individual equipment information database allows a user to leave equipment information stored in his/her individual area in the individual equipment information database, instead of deleting the equipment information, even if the user resigns from the corporate business and can no longer look up the contents of the group equipment information database.

With the industrial equipment management system S, which sets authority data for each group ID, detailed terms of access can be laid down for access to a group area of one group ID with the use of another group ID. In the field of industrial equipments, in particular, where balancing the sharing of users' know-bows and the prevention of leakage of the know-bows is important, providing the authority data keeps the two balanced favorably by, for example, allowing only groups that are strongly related to each other to share know-bows and restricting the sharing of know-bows between groups that are not significantly related to each other.

The industrial equipment management system S, which leaves only encrypted equipment information on the motor control device maintenance terminal 20 when equipment information is displayed, is also capable of improving the security effectively. For instance, if a use with malicious intent operates his/her computer immediately before resigning so that equipment information that is stored in a group area is displayed on the computer, only encrypted equipment information remains on the computer, which prevents the user from leaking know-bows by directly taking the equipment information out of the memory of the computer after resigning.

To display equipment information that is stored in a group area in the display screen 100, the motor control device maintenance terminal 20 acquires the equipment information. The industrial equipment management system S in this case restricts the motor control device maintenance terminal 20 from storing unencrypted equipment information in a non-volatile memory, thereby reducing the risk of leakage of know-bows even more effectively. For instance, if decrypted equipment information is stored in a non-volatile memory in order to display equipment information that is stored in a group area, equipment information in plaintext is left in the non-volatile memory, thereby allowing a user with malicious intent to directly take other users' know-bows that have been displayed before the user resigns. The industrial equipment management system S is free from this problem because equipment information in plaintext is erased at a given timing by storing equipment information in plaintext in a volatile memory instead of a non-volatile memory. The risk of a user with malicious intent taking equipment information in plaintext is thus reduced effectively.

[Modification Example]

The equipment information is not limited to the one given in the above-mentioned example. In the case where an encoder is connected to each motor control device 10 in order to detect the rotational position of the relevant motor 1, for example, the motor control device 10 may operate based on motor information (of which details are described later) stored in a memory of the encoder. In the case where no encoders are used, on the other hand, the motor information may be included in the equipment information. In this manner, the motor control device 10 can positively identify information on the motor 1 even when there is no encoder.

The motor information in this case may be stored for each motor control device 10 in the individual area or the group area that is associated with the serial number of the motor control device 10, or may be stored for each motor 1 in the individual area or the group area that is associated with the serial number of the motor 1 and in the equipment master database managed by the maker. Each motor control device 10 acquires the motor information from the cloud server 60 via the controller 40 at an arbitrary timing (for example, the time when control of the motor 1 is started). Alternatively, the motor control device 10 may acquires the motor information from the cloud server 60 via the motor control device maintenance terminal 20. In the case of the motor control device 10 that can be connected to the network N, the motor control device 10 may acquire the motor information directly from the cloud server 60.

The motor information managed on the cloud server 60 includes, for example, (1) the type of the motor 1 (a rotary type, a linear type, and the like), (2) model information of the motor 1 (the model number and the like), and (3) parameter information about the motor 1. It suffices that parameters suitable for the type of the motor 1 of interest are stored as the parameter information. In the case of a rotary type, for example, rated torque, rated power, rated rotational speed, instantaneous maximum torque, motor inertia moment, pole number, highest rotational speed, rated current, maximum current, d-axis inductance, and q-axis inductance are stored as the parameter information. In the case of a linear type, for example, maximum thrust, rated thrust, moving coil mass, rated speed, highest speed, pole pitch, rated current, maximum current, d-axis inductance, and q-axis inductance are stored as the parameter information.

The present invention may also be designed so that a decryption key used to display equipment information in the display screen 100 is not notified to the user. For instance, while data that represents the decryption key itself is stored in the storage 20b, the authority to view the data may be denied to the user. In other words, the program that performs encryption and decryption may be devoid of a user interface that notifies information for decryption to the user. This idea may be advanced further by, for example, not notifying to the user a memory address at which equipment information displayed in the display screen 100 is stored. In other words, the program for displaying equipment information may be devoid of a user interface that notifies to the user a memory address at which the equipment information is temporarily stored.

The authority data may define which of viewing, editing, and deleting a group that has access to equipment information is allowed to perform. In this way, the level of access authority can be set for each group. The authority data may further define, for each of individual IDs that belong to a group ID, the authority to access (e.g., which of viewing, editing, and deleting is permitted) equipment information stored in a group area of the group ID. In this way, the level of access authority can be set for each user.

While the embodiment describes a case in which a user uses the motor control device maintenance terminal 20 to display equipment information, it is sufficient if a terminal that can be connected to the cloud server 60 is used. For instance, the user may use the maintenance-use portable terminal 30 or the controller maintenance terminal 50 to display equipment information.

Further, the embodiment is described by taking an exemplary case where the equipment information on the motor control device 10 is managed as an example of the equipment information on the industrial equipment, but the equipment information to be managed in the industrial equipment management system S is not limited thereto. In addition to the servo amplifier described as an example the motor control device 10, the industrial equipment management system S can also manage the equipment information on general industrial equipments such as a controller, an inverter, and a robot controller. In this case, the setting information for the controller, the inverter, the robot controller, and the like may be registered in the cloud server 60 as the equipment information.

A diversity of communication protocols can be applied to the transmission/reception of various types of data between an industrial equipment that can be connected to the network N (for example, the controller 40) and the respective servers (for example, the cloud server 60). An example of the communication protocols that can be used is File Transfer Protocol (FTP).

For example, the function of an FTP client is installed in the industrial equipment and the function of an FTP server is installed in the server. In this case, the server that is an FTP server waits for a communication connection request conforming to FTP from the industrial equipment that is an FTP client. Once issuing the communication connection request to the server, the industrial equipment can transfer data and a program that are stored in its own storage (for example, setting information of the industrial equipment, firmware, and logging data that is a record of the operation situation or the like of the industrial equipment) to the server as a transfer target file to be recorded in the server-side storage. The industrial equipment can further acquire data and a program that are stored in the server-side storage (for example, setting information of this or another industrial equipment, and firmware) as a transfer target file to be recorded in its own storage. In this manner, the industrial equipment can transfer data between its own storage and the server-side storage at an arbitrary timing.

This embodiment also encompasses a case opposite to the one described above in which the function of an FTP server is installed in the industrial equipment and the function of an FTP client is installed in the server. In this case, the industrial equipment that is an FTP server waits for a communication connection request conforming to FTP from the server that is an FTP client. Once issuing the communication connection request to the industrial equipment, the server can transfer data and a program that are stored in the server-side storage (for example, setting information of this or another industrial equipment, firmware) to the industrial equipment as a transfer target file to be recorded in the storage of the industrial equipment. The server can further acquire data and a program that are stored in the storage or the industrial equipment (for example, setting information of the industrial equipment, firmware, and logging data) as a transfer target file to be recorded in its own storage. In this manner, the server can transfer data between the server-side storage and the storage of the industrial equipment at an arbitrary timing.

In the case where a file transmitted/received in the manner described above is data that is stored in the user area of the equipment information, data registered in the user area by each user can be acquired by the industrial equipment from the server, or can be transferred from the server to the industrial equipment, at an arbitrary timing.

Note that, the copy restricting unit 65b may be copy preventing means for preventing copying of the equipment information stored in the group area to the individual area. Other than the preventing copying of the equipment information as described with reference to the embodiment and the like, the copy restricting unit 65b may execute copy guard processing of an equipment information file and stores the equipment information file in the group area. When a data form of the equipment information file is a data form which can be set a file attribute for preventing copying of the equipment information file (copy restricting attribute), the copy restricting unit 65b may set the file attribute of the equipment information file as a copy restricting attribute. For another example, the copy restricting unit 65b may requires password for copying, when an operation for copying of the equipment information stored in the group area is executed. The individual area control unit 64 may be individual area controlling means for controlling access to the individual area based on the individual ID. The group area control unit 66 may be group area controlling means for controlling access to the group area based on the individual ID that belongs to the group ID. The copy permitting unit 65a may be copy permitting means for permitting copying of the equipment information that is stored in the individual area to the group area. The generating unit 67a may be generating means for generating the setting information ID for identifying the setting information. The determining unit 67b may be determining means for determining, based on the individual ID or the group ID, whether or not the generator is to generate the setting information ID. The securing unit 62b may be securing means for securing the individual area on the server. The affiliation permitting unit 62c may be affiliation permitting means for permitting the individual ID to respectively belong to the group ID after the individual area is secured. The authority data acquiring unit 66b may be acquiring means for acquiring the data that defines access authority between the group IDs. The equipment information transmitting unit 66a may be transmitting means for transmitting the equipment information that is encrypted to the operating terminal.

The embodiment described above is given as a concrete example, and is not to limit the invention disclosed herein to the very configuration and data storage examples of the concrete example. A person skilled in the art may make various modifications to the disclosed embodiment with regard to, for example, the shapes and counts of physical components, and data structures. It is to be understood that the technical scope of the invention disclosed herein encompasses such modifications. It should be understood by those skilled in the art that various modifications, combinations, sub-combinations and alterations may occur depending on design requirements and other factors insofar as they are within the scope of the appended claims or the equivalents thereof.

What is claimed is:

1. An industrial equipment management system, comprising:
    at least one processor; and
    industrial equipment which is a motor or which is equipment relating to controlling a motor;
    wherein the at least one processor writes a setting information that is adjusted by a user and is relating to motor control in a memory;
    wherein the industrial equipment operates based on the setting information stored in the memory;
    wherein the at least one processor:
    uploads the setting information stored in the memory to an individual area which is a storage area that is associated with an individual ID of the user on a server;
    permits the user to copy the setting information stored in the individual area to a group area which is a storage area that is associated with a group ID to which the individual ID of the user belongs on the server;
    permits another user whose individual ID belongs to the group ID to view the setting information stored in the group area;

restricts copying of the setting information stored in the group area to the individual area;
permits the user to download the setting information stored in the individual area; and
writes the downloaded setting information in the memory;
wherein the industrial equipment operates based on the downloaded setting information stored in the memory;
wherein the at least one processor:
generates a setting ID for identifying the setting information stored in the group area and ordering new industrial equipment which stores the setting information stored in the group area; and
determines, based on the individual ID or the group ID, whether to generate the setting ID.

2. The industrial equipment management system according to claim 1, wherein the at least one processor:
secures the individual area on the server; and
permits the individual ID to respectively belong to the group ID after the individual area is secured.

3. The industrial equipment management system according to claim 1, wherein the at least one processor acquires data that defines access authority between group IDs, and controls, based on the data, access to a group area associated with one group ID that is based on an individual ID belonging to another group ID.

4. The industrial equipment management system according to claim 1, wherein:
the at least one processor transmits setting information that is encrypted to an operating terminal; and
the operating terminal comprises a storage configured to store the encrypted setting information, decrypts the stored encrypted setting information, and displays the decrypted setting information.

5. The industrial equipment management system according to claim 4, wherein at least one processor restricts copying of setting information that is not encrypted to the storage of the operating terminal.

6. An industrial equipment management server, comprising at least one physical processor which is configured to:
receive setting information that is adjusted by a user, said setting information relating to motor control of industrial equipment;
write the received setting information in an individual area which is a storage area that is associated with an individual ID of the user on a server;
permit the user to copy the setting information stored in the individual area to a group area which is a storage area that is associated with a group ID to which the individual ID belongs on the server;
permit another user whose individual ID belongs to the group ID to view the setting information stored in the group area;
restrict copying of the setting information stored in the group area to the individual area;
permit the user to download the setting information stored in the individual area for the motor control;
generate a setting ID for identifying the setting information stored in the group area and ordering new industrial equipment which stores the setting information stored in the group area; and
determine, based on the individual ID or the group ID, whether to generate the setting ID.

7. An industrial equipment management method, comprising:
writing setting information in memory, said setting information being adjusted by a user and relating to motor control;
operating industrial equipment that is a motor or equipment relating to the motor control based on the setting information stored in the memory;
uploading the setting information stored in the memory to an individual area which is a storage area that is associated with an individual ID of the user on a server;
permitting the user to copy the setting information stored in the individual area to a group area which is a storage area that is associated with a group ID to which the individual ID belongs on the server;
permitting another user whose individual ID belongs to the group ID to view the setting information stored in the group area;
restricting copying of the setting information stored in the group area to the individual area;
permitting the user to download the setting information stored in the individual area;
writing the downloaded setting information in the memory;
operating the industrial equipment based on the downloaded setting information stored in the memory:
generating a setting ID for identifying the setting information stored in the group area and ordering new industrial equipment which stores the setting information stored in the group area; and
determining, based on the individual ID or the group ID, whether to generate the setting ID.

8. A non-transitory computer-readable information storage medium having stored thereon a program for causing a computer to:
receive setting information that is adjusted by a user and relates to motor control of industrial equipment;
write the received setting information in an individual area which is a storage area that is associated with an individual ID of the user on a server;
permit the user to copy the setting information stored in the individual area to a group area which is a storage area that is associated with a group ID to which the individual ID belongs on the server;
permit another user whose individual ID belongs to the group ID to view the setting information stored in the group area;
restrict copying of the setting information stored in the group area to the individual area;
permit the user to download the setting information stored in the individual area for the motor control;
generate a setting ID for identifying the setting information stored in the group area and ordering new industrial equipment which stores the setting information stored in the group area; and
determine, based on the individual ID or the group ID, whether to generate the setting ID.

9. An industrial equipment management system, comprising:
industrial equipment that is a motor or equipment relating to motor control;
individual area controlling means for uploading setting information that adjusted by a user and is relating to motor control to an individual area which is a storage area that is associated with an individual ID of the user on a server;
group area controlling means for permitting the user to copy the setting information stored in the individual area to a group area which is a storage area that is associated with a group ID to which the individual ID of the user belongs on the server;

means for permitting another user whose individual ID belongs to the group ID to view the setting information stored in the group area;
copy preventing means for preventing copying of the setting information stored in the group area to the individual area;
means for permitting the user to download the setting information stored in the individual area; and
means for writing the downloaded setting information in the memory;
wherein the industrial equipment operates based on the downloaded setting information,
wherein the industrial equipment management system further comprises:
generating means for generating a setting ID for identifying the setting information stored in the group area and ordering new industrial equipment which stores the setting information stored in the group area; and
determining means for determining, based on the individual ID or the group ID, whether to generate the setting ID.

* * * * *